US010372736B2

(12) United States Patent
Li et al.

(10) Patent No.: US 10,372,736 B2
(45) Date of Patent: Aug. 6, 2019

(54) GENERATING AND IMPLEMENTING LOCAL SEARCH ENGINES OVER LARGE DATABASES

(71) Applicant: UNIVERSITY OF UTAH RESEARCH FOUNDATION, Salt Lake City, UT (US)

(72) Inventors: Feifei Li, Salt Lake City, UT (US); Cody Hansen, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 807 days.

(21) Appl. No.: 14/891,318

(22) PCT Filed: May 16, 2014

(86) PCT No.: PCT/US2014/038459
§ 371 (c)(1),
(2) Date: Nov. 13, 2015

(87) PCT Pub. No.: WO2014/186745
PCT Pub. Date: Nov. 20, 2014

(65) Prior Publication Data
US 2016/0103906 A1 Apr. 14, 2016

Related U.S. Application Data

(60) Provisional application No. 61/824,215, filed on May 16, 2013.

(51) Int. Cl.
*G06F 16/00* (2019.01)
*G06F 16/31* (2019.01)
(Continued)

(52) U.S. Cl.
CPC .......... *G06F 16/319* (2019.01); *G06F 16/313* (2019.01); *G06F 16/334* (2019.01); *G06F 16/3331* (2019.01); *G06F 17/2705* (2013.01)

(58) Field of Classification Search
None
See application file for complete search history.

(56) References Cited

U.S. PATENT DOCUMENTS 5,832,500 A 11/1998 Burrows
7,590,645 B2 9/2009 Nayak
(Continued)

FOREIGN PATENT DOCUMENTS

WO 2014186745 11/2014

OTHER PUBLICATIONS

Interntational Search Report and Written Opinion, U.S. International Search Authority, PCT/US2014/038459, Completed Sep. 2, 2014.

(Continued)

*Primary Examiner* — Son T Hoang
(74) *Attorney, Agent, or Firm* — Workman Nydegger (57) ABSTRACT

A computing system receives as inputs data records stored in a database. The computing parses the data records into file pairs that each include a keyword file and record ID file and merge file pairs into a keyword file and record ID file, where the keyword file includes keywords in sorted order, and where the record ID file includes a list of record IDs for keywords in the keyword file. The computing system further creates an offset file which stores offset values for starting addresses of record ID lists in the record ID file, and generates an index of keywords by assigning unique identifiers to keywords in the keyword file. The computing system also provides a query interface that allows the database's data records to be searched using the generated index of keywords.

17 Claims, 5 Drawing Sheets

(51) Int. Cl.
G06F 16/33 (2019.01)
G06F 17/27 (2006.01)

(56) References Cited

U.S. PATENT DOCUMENTS

| | | |
|---|---|---|
| 7,788,248 B2 | 8/2010 | Forstall et al. |
| 8,417,727 B2 | 4/2013 | Slezak et al. |
| 2003/0229626 A1* | 12/2003 | Nayak ............... G06F 17/30622 |
| 2006/0059144 A1 | 3/2006 | Canright et al. |
| 2008/0082530 A1 | 4/2008 | Grabowski et al. |
| 2010/0010989 A1* | 1/2010 | Li ........................ G06F 17/273 |
| | | 707/E17.017 |
| 2012/0011150 A1* | 1/2012 | Swaminathan ... G06F 17/30699 |
| | | 707/770 |

OTHER PUBLICATIONS

International Search Report and Written Opinion for PCT/US2014/038459 dated Sep. 30, 2014.

* cited by examiner

| Cody Orlando| |
|---|
| The Keyword(s) Cody Orlando Matched 20 Record(s) |
| The Keyword(s) Cordy Orlando Matched 1 Record(s) |
| The Keyword(s) Cozy Orlando Matched 1 Record(s) |
| The Keyword(s) Body Orlando Matched 3 Record(s) |
| The Keyword(s) Cory Orlando Matched 19 Record(s) |

GENERATING AND IMPLEMENTING LOCAL SEARCH ENGINES OVER LARGE DATABASES

CROSS-REFERENCE TO RELATED APPLICATION

This application claims the benefit of and priority of PCT Application No. PCT/US2014/038459, filed May 16, 2014, entitled "GENERATING AND IMPLEMENTING LOCAL SEARCH ENGINES OVER LARGE DATABASES", which claims the benefit of and priority to U.S. Provisional Patent Application No. 61/824,215, entitled "GENERATING AND IMPLEMENTING LOCAL SEARCH ENGINES OVER LARGE DATABASES", filed on May 16, 2013. All of the aforementioned applications are incorporated by reference herein in their entirety.

This invention was made with government support under 0916488, 1053979 and 1200792 awarded by the National Science Foundation. The government has certain rights in the invention.

BACKGROUND

In many database applications, search is still executed via form-based query interfaces, which are then translated into structured query language (SQL) statements to find matching records. Ranking is typically not implemented unless users have explicitly indicated how to rank the matching records (e.g., in the ascending order of year). Often, this approach is neither intuitive nor user-friendly (especially with many search fields in a query form). It may also require application developers to design schema-specific query forms and develop specific programs that understand these forms.

BRIEF SUMMARY

Embodiments described herein are directed to providing local search engines over large databases. In one embodiment, a computing system is provided that includes modules for performing different types of functionality. The computing system includes a parsing module that receives as inputs data records stored in a database, and parses the data records into file pairs that each include a keyword file and record ID file. Each file pair implicitly forms a set of inverted lists from the keywords in the keyword file to add record IDs to the record ID file. The computing system further includes a merging module that merges file pairs into a keyword file and a record ID file, where the keyword file includes keywords in sorted order and where the record ID file includes a list of record IDs for keywords in the keyword file. The merging module further creates an offset file which stores offset values for starting addresses of record ID lists in the record ID file. The computing system also includes a generating module that generates an index of keywords by assigning unique identifiers to the keywords in the keyword file, where the index allows searches to return those keyword IDs that correspond to keywords that are sufficiently similar to a search term. Still further, the computing system includes a searching module that provides a query interface that allows the database's data records to be searched using the generated index of keywords.

In another embodiment, a method is provided for providing local search engines over large databases. The method includes receiving as inputs data records stored in a database. The method next includes parsing the data records into file pairs that each include a keyword file and record ID file, where each file pair implicitly forms a set of inverted lists from the keywords in the keyword file to add record IDs to the record ID file. The method also includes merging file pairs into a keyword file and a record ID file, where the keyword file includes keywords in sorted order, and where the record ID file includes a list of record IDs for keywords in the keyword file. The method further includes creating an offset file which stores offset values for starting addresses of record ID lists in the record ID file, and generating an index of keywords by assigning unique identifiers to the keywords in the keyword file. The index allows searches to return those keyword IDs that correspond to keywords that are sufficiently similar to a search term. The method also includes providing a query interface that allows the database's data records to be searched using the generated index of keywords.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to providing local search engines over large databases. In one embodiment, a computing system is provided that includes modules for performing different types of functionality. The computing system includes a parsing module that receives as inputs data records stored in a database, and parses the data records into file pairs that each include a keyword file and record ID file. Each file pair implicitly forms a set of inverted lists from the keywords in the keyword file to add record IDs to the record ID file. The computing system further includes a merging module that merges file pairs into a keyword file and a record ID file, where the keyword file includes keywords in sorted order and where the record ID file includes a list of record IDs for keywords in the keyword file. The merging module further creates an offset file which stores offset values for starting addresses of record ID lists in the record ID file. The computing system also includes a generating module that generates an index of keywords by assigning unique identifiers to the keywords in the keyword file, where the index allows searches to return those keyword IDs that correspond to keywords that are sufficiently similar to a search term. Still further, the computing system includes a searching module that provides a query interface that allows the database's data records to be searched using the generated index of keywords.

In another embodiment, a method is provided for providing local search engines over large databases. The method includes receiving as inputs data records stored in a database. The method next includes parsing the data records into file pairs that each include a keyword file and record ID file, where each file pair implicitly forms a set of inverted lists from the keywords in the keyword file to add record IDs to the record ID file. The method also includes merging file pairs into a keyword file and a record ID file, where the keyword file includes keywords in sorted order, and where the record ID file includes a list of record IDs for keywords in the keyword file. The method further includes creating an offset file which stores offset values for starting addresses of record ID lists in the record ID file, and generating an index of keywords by assigning unique identifiers to the keywords in the keyword file. The index allows searches to return those keyword IDs that correspond to keywords that are sufficiently similar to a search term. The method also includes providing a query interface that allows the database's data records to be searched using the generated index of keywords.

Embodiments described herein are generally directed to providing local search engines over large databases. These embodiments may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

In embodiments described herein, a system is described which enables users to quickly build and deploy a search-engine-like system over a large database. Once deployed, the search system instance can execute search-engine-like queries efficiently and effectively. In some cases, the search system supports features such as search-as-you-type, approximate search using multiple keywords, recommendations and rankings based on the query keywords (beyond simple database ranking operators, e.g., rank by year in ascending order).

Figure 1:
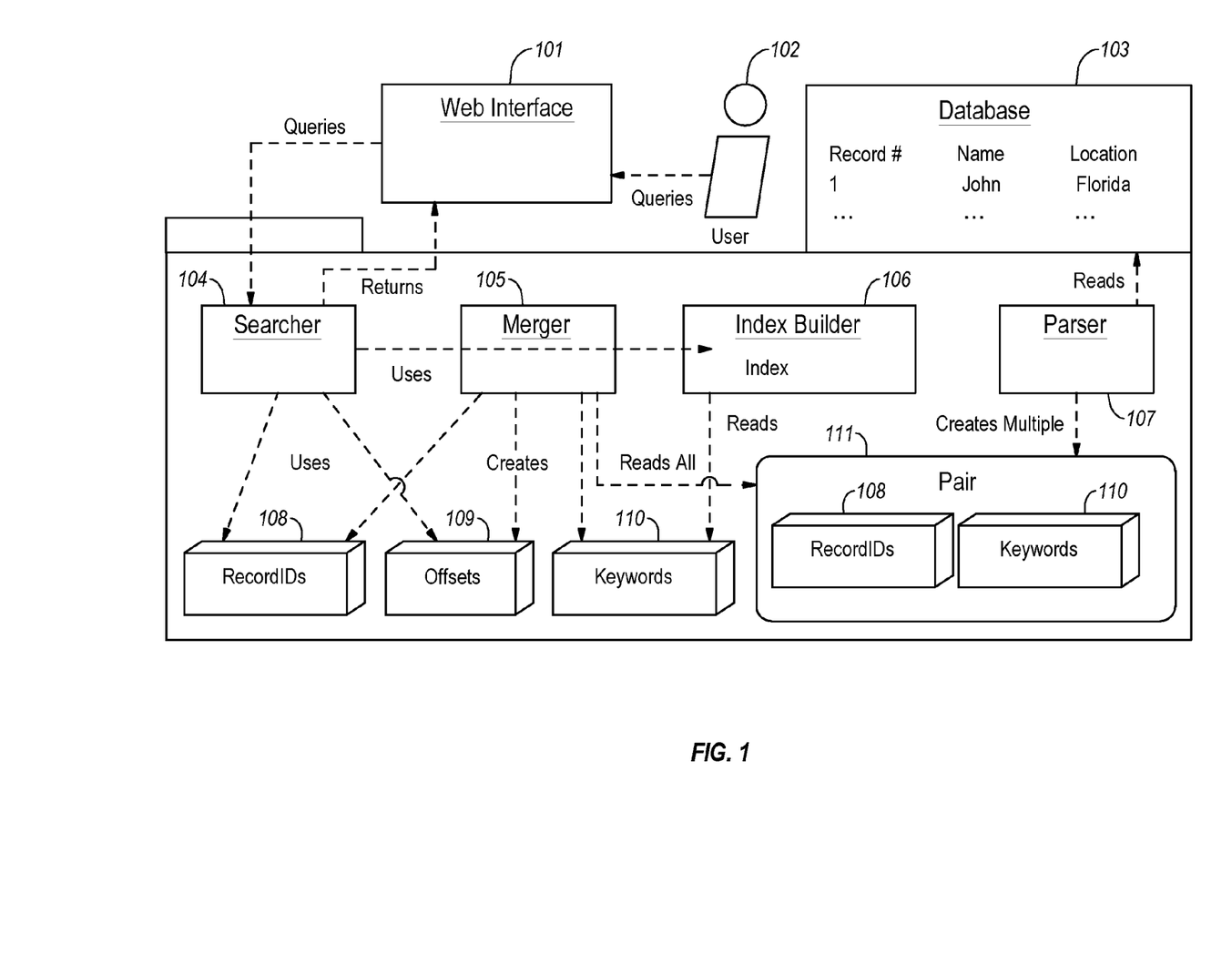
FIG. 1 illustrates a computer architecture in which embodiments described herein may operate including providing a local search engine over a large database.

As shown in FIG. 1, the search system may include multiple different elements. For instance, the search system may include a graphical user interface (in the form of a web or other interface) 101. The search system may start the process of providing a local search engine over large data structures by accessing data records in a database. The search system may include at least four modules as shown in FIG. 1, including: the parser 107, the merger 105, the index builder 106, and the searcher 104. Each of these modules will be explained in greater detail below, while describing the construction of the engine, the search, and the updates in the search system. For ease of illustration, it should be assumed in FIG. 1 that a database (D) consists of a single table.

In some embodiments, building a local search engine may include the following steps: parsing, merging, and indexing. These steps are the responsibility of the parser 107, the merger 105, and the index builder 106, respectively. The parsing step parses D into keyword-based inverted lists, one list per distinct keyword in D. For a distinct keyword w, its list L(w) has the record IDs (or "ids" herein) for all records in D that contain w. That said, the parser 107 maintains a hashmap (H) while scanning through records in D. An entry e in H has a distinct keyword w(e) as its key, and a vector v(e) of record ids ("rids" herein) as its value, such that each record corresponding to a rid value from v(e) contains w(e) (in at least one of its attributes). When the parser iterates through a record r in D, the parser views the entire record r as a single string s, regardless of the types of its different attributes. Next, s is tokenized into a set of keywords {w1, . . . , wt} (using the whitespace as the delimiter, except for certain special attributes such as phone numbers), one at a time.

Figure 2:
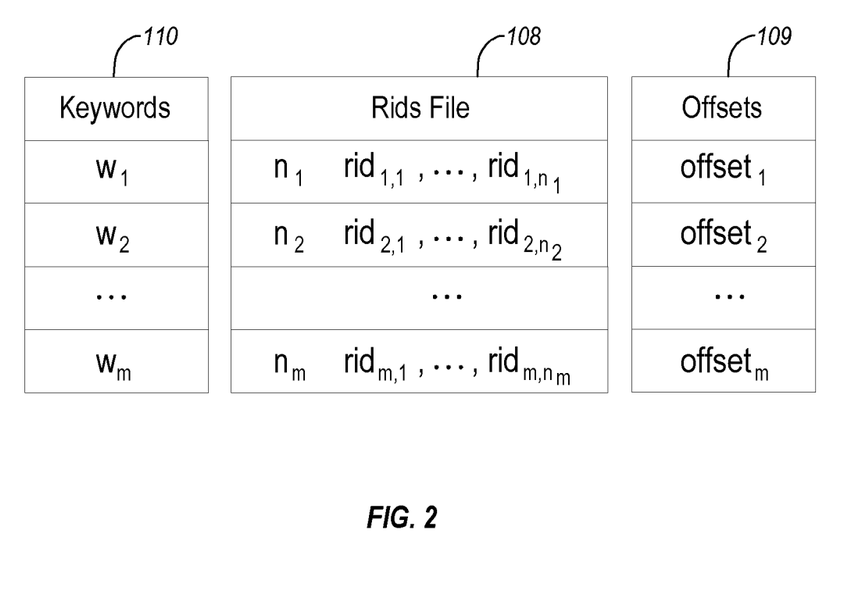
FIG. 2 illustrates an embodiment of a live local search system instance that includes keywords, a rids file and offset values.

Suppose the record id (rid) of r is j, the pairs (wi, j) for i=1, . . . , t are inserted into H. In some embodiments, H may become too large to fit in the memory. To handle this situation, a customized storage engine may be implemented which caters for massive data. FIG. 2 illustrates this concept. For example, in a live local search system instance, there may be three files: the (ascii) keyword file 110, the (binary) rids file 108, and the (binary) offset file 109. The keyword file stores all distinct keywords {w1, . . . , w4$_m$} in sorted order from H, line delimited. The rids file stores the lists of record ids for keywords in the keyword file, (at least in some cases) in the same order as keywords appear in the keyword file. At the head of each list Li for keyword ki, it also stores an integer ni which states how many rids Li contains. Since each element in any list Li is a rid which can be represented as an unsigned integer, any ni is also an unsigned integer. The rids file is thus a binary file of unsigned integers. Finally, the binary offset file 109 (for facilitating the searcher 104) stores m offset values. The ith value offset i stores the offset of the ith list in the rids file, i.e., it is the starting address of ni in the rids file.

When H is first initialized, it is denoted as iteration 1. Whenever the size of H exceeds the available memory after inserting a (keyword, rid) pair 111, H is stored to disk and emptied. This marks the end of the current iteration. The local search system then resumes processing the next (keyword, rid) pair which marks the beginning of a new iteration. That said, at the end of the ith iteration, H is dumped into two files F and Fr$^i$id, where F is a (sorted) keyword file storing all keywords from H in the ith iteration, and F$^i$rid is a rids file storing the corresponding rids lists. At the end of the parsing step, a series of these pairs of files results, one pair per iteration.

Suppose, in one example, that the parsing phase produces T iterations. The next phase is the merging phase, where the merger 105 merges T pairs of files into a single pair of files, i.e., it creates a single keyword file Fk (110) and rids file Frid (108) from {(Fk$^1$, F$^1_{rid}$), (Fk$^T$, F$^T$rid)}. Since each pair of files is sorted to begin with, this merging step is fairly easy to execute. Consider an example when T=2, two cursors I1 and I2 are maintained, one cursor per keyword file (initialized at the first record in each file respectively). The smaller keyword is outputted to the output keyword file Fk among the two keywords currently pointed by I1 and I2. Two cursors O1 and O2 are also maintained, initialized at the first byte of $Fr^1id$ and $F^2rid$. Without loss of generality, suppose the first keyword w1 in $Fk^1$ pointed by I1 is the first one being pushed to Fk. The starting address of n1 and L1 (the list of rids for records that contain w1) in $F^1,id$ is given by O1.

The search system can then read (n1+1)·b bytes sequentially from $Fr^1id$ to retrieve the binary content of n1 and L1, where b is the size of an unsigned integer. These (n1+1)·b bytes will be pushed to the output file Frid. After that, I1 is moved to the second keyword in $Fk^1$, and O1 by (n1+1)·b bytes. The starting address of n1 and L1 are written in Frid as an unsigned integer to a file Foffset. A special case is when keywords wi and wj pointed by I1 and I2 are the same word w. When this happens, the corresponding lists Li and Lj (pointed by O1 and O2 in $F^1rid$ and $F^2rid$ respectively) are merged into one list L(w), w is written to $F_w$ and (|L(w)|, L(w)) to Frid, and I1, I2, O1, and O2 are moved forward accordingly. This process is then recursed, till both I1 and I2 point to the end of $Fk^1$ and $Fk^2$ respectively.

A user could generalize the above procedure to merge T pairs of keywords and rids files at the same time, by maintaining T cursors instead. This produces the keywords, the rids, and the offsets files Fk, Frid and Foffset, as described in FIG. 2. These correspond to the dumped content of the hashmap H as if it was built over the entire D and never exceeded the available memory. It should be noted that this merging can also be performed in parallel (two pairs in a thread) following a divide-and-conquer scheme. More interestingly, the parsing and merging phases may, at least in some cases, be ideal for parallelization over massive data in certain products or databases.

The third phase is to index the keywords from Fk to support the approximate string search and the search-as-you-type feature. Unique identifiers are assigned to keywords in Fk based on the ordering in Fk, i.e., the ith keyword in Fk is assigned the id i. The builder 106 indexes these unique ids so that given a query keyword q, the builder can quickly retrieve all keyword ids that correspond to keywords that are similar to q [1]. The local search system also supports a variety of approximate string match metrics, such as the edit distance, the jaccard similarity, the cosine similarity and the dice similarity. Various libraries are incorporated in the local search system (e.g. in the index builder 106 in FIG. 1), which builds the index over Fk.

Figure 3:
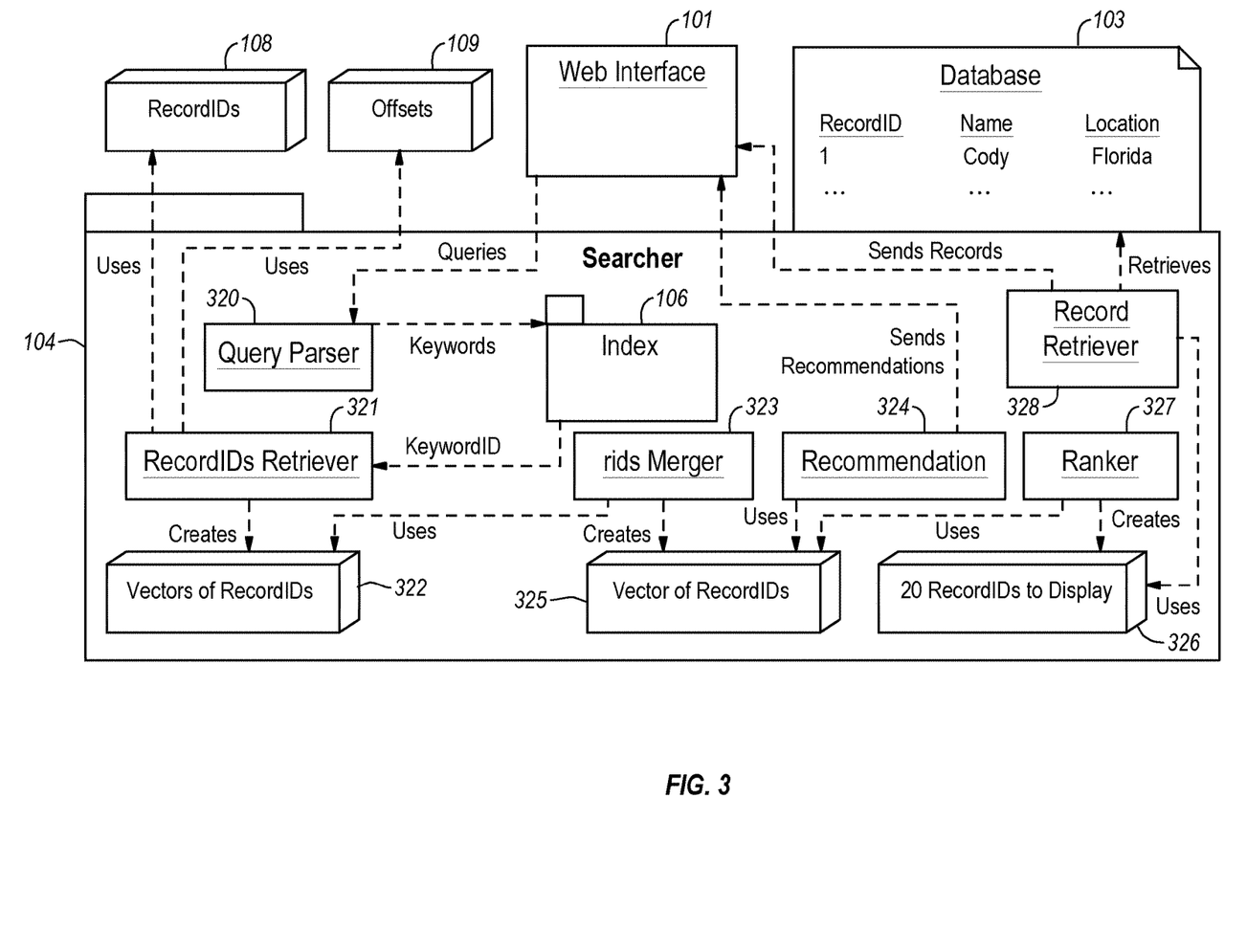
FIG. 3 illustrates an alternative computer architecture in which embodiments described herein may operate including providing a local search engine over a large database.

An overview of the search process in the local search system is provided in FIG. 3. It starts with parsing a user query at query parser 320 into a set of query keywords $\{q1 \ldots q_u\}$. Next, for each qi, the index generated by the index builder 106 is used to get a vector 325 wi of keyword ids 322 that correspond to keywords in Fk that are similar to qi (based on any of the string similarity metrics). In some cases, the default is to use the edit distance. Next, wi is converted to a vector vi of rids 322, which correspond to those records that contain at least one keyword identified by keyword ids in wi. To do so efficiently, for every keyword id j∈wi, its offset value (offset j) is found in Foffset. Note that this can be done in constant time and IO, by using seek functionality available in a binary file. Specifically, the starting address of offset j in Foffset is (j−1)b, where b is the size of an unsigned integer. Given offset j, the seek functionality is again used but on the binary file Frid, to retrieve the value nj in constant time and IO. The retrieving may be performed by record retriever 328. After that, Lj is loaded sequentially by reading njb bytes from Frid coming after nj. Each such Lj is then inserted into vi for any j∈wi.

Once these vectors of rids, vi for qi, have been determined, the rids that appear at least τ (a system threshold) times are retrieved by module 321. To find those rids, the local search system designs an algorithm that shares similar principles to a MergeSkip algorithm. In particular, this algorithm (rids Merger 323) uses a heap, binary search and additional popping and pruning rules to achieve efficiency and scalability. During this process the system also ensures that the count on the number of matches does come from different keywords. For example, a search for "blue cat" does not return a record containing both "fat" and "cat", but no words that match "blue" (if τ=2). In some cases, the threshold τ is set to be equal to the number of keywords in user queries, but this may be adjusted, even dynamically.

The rids merger stores the desired rids in a vector v 322. Every rid in v corresponds to a record that matches the query (with at least τ similar keywords between the two). Instead of simply displaying these records back to the user, the search system performs recommendations 324 and rankings 327 based the results of the merger. Suppose for a rid j in v, its record rj matches a τ query keywords as determined by the merger. The search system can rank the results by a variety of different methods. In some cases, it may rank records that match every query keyword exactly above all others. The rest are ranked by the combination of their a values and the rarity of the keyword combination they matched by. Ranked record IDs may be displayed 326 for viewing by a user.

Figure 4:
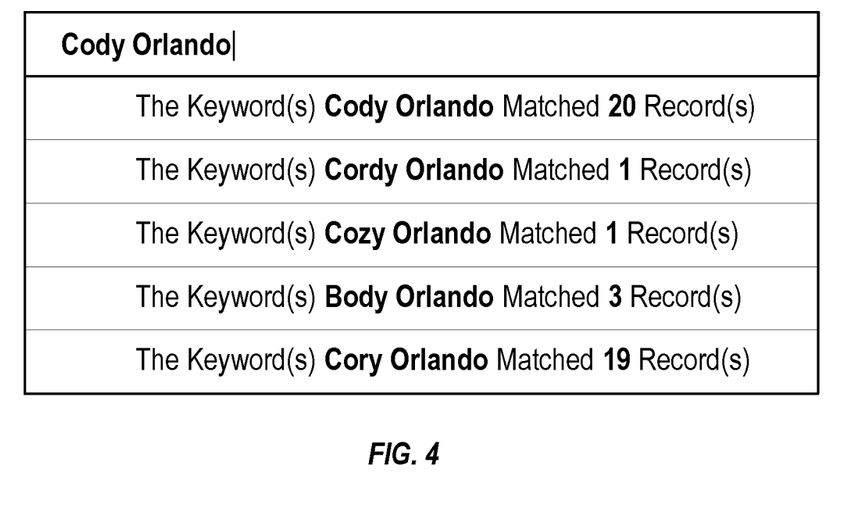
FIG. 4 illustrates an embodiment that includes example search results.

Consider the example in FIG. 4, if the system is queried by "cody orlando", the records that contain both "cody" and "orlando" will be ranked first. Then let there be one record that contains "cozy" and "orlando", and three records that contain "body" and "orlando". The record containing "cozy" and "orlando" would be ranked above the other three records because the keyword combination "cozy" and "orlando" is rarer than the combination of "body" and "orlando". This ranking shows the user the rare matches above others and will therefore effectively prune out obvious and common keywords that are not effective to search by. When there is a tie in the rarity of two records (the rarity for the combination of matched keywords from them), their values are used to break the tie.

To estimate the rarity of a record r, various strategies may be implanted. In the first strategy, the rarity of the matched keywords of r is estimated based on only records from v. This can be done at the query time by dynamically building a matched-keywords histogram while processing records in v. In the second strategy, the rarity of the matched keywords of r is estimated based on all records in D, which builds (and maintains) a matched-keywords histogram incrementally over time. This can be done via the help of the inverted lists of distinct keywords and the search history.

Other types of ranking strategies may also be implemented, such as ranked by the rarest keyword from each matched record (instead of using the combination of matched keywords). The ranking is easily adjustable and could be also offered as a user choice in our system. By default, at least in some cases, the above ranking method has been used to determine the rarity of the combination of matched keywords. Based on this ranking framework, a flexible and effective recommendation module 324 may be implemented. When a search is made (while users are typing it) the potentially matched keyword combinations are showed, along with how many records matched that keyword combination. They are adjusted in real time while user is typing each single character in the search box. And, just like most popular search engines, users can select a search to see those results (as shown in FIG. 4). This allows users to make a search, see the results and see what other keywords are in the data, and easily find the records they wanted to see (i.e., refine their search). The search system may also implement a prefix search that is done on the final word of the query in addition to the fuzzy search. These features together guide the users to the results they want to see quickly and efficiently, even when they know nothing about the schema of the underlying data.

The design of the local search system permits efficient updates, especially for batched insertions and deletions. As such, a new pair of keywords and rids files may be created for affected records. Then, the merger 105 in FIG. 1 may be used to merge them with the existing keywords 110 and rids files 108. Supporting batched deletions is also contemplated herein.

A parallel version of the construction module may be implemented in a MapReduce cluster. In such cases, it may achieve almost a linear speedup to the number of machines deployed in the MapReduce cluster. In some embodiments, a cluster of commodity machines may be implemented in the query process. The ranking and recommendation modules may be enhanced by leveraging associations and linkage/lineage between keywords inside the database. Moreover, certain ontology information (either built from the underlying database or made available through another data source such as Wikipedia) may be used to achieve context-aware ranking and recommendations.

In one embodiment, a computer system is implemented to perform a local search-engine-like search on database data. The computer system includes a parsing module that receives as inputs various data records stored in a database 103, and parses the data records into file pairs 111 that each includes a keyword file 110 and record ID file 108. The computer system further includes a merging module that merges multiple file pairs into a single keyword file 110 and record ID file 108. The keyword file includes keywords in sorted order, and the record ID file includes a list of record IDs for keywords in the keyword file. The merging module also creates an offset file which stores offset values for starting addresses of record ID lists in the record ID file. A building module is also included which builds an index of keywords by assigning unique identifiers to the keywords in the keyword file, the index allowing searches to return those keyword IDs that correspond to keywords that are similar to a search term. The computer system also includes a searching module that provides a web-based, search-engine-like query interface 101 for searching the database's data records using the generated keyword index.

In some embodiments, as explained above, the parsing module parses the database data records into one keyword-based inverted list per distinct keyword. The parsing module may also maintain a hashmap while scanning through the database data records, where the hashmap includes various entries with a keyword and a vector or record IDs. The parsing module of the computer system may view each database record as a single string, regardless of the types of the string's attributes. Furthermore, the computer system may support any one or more of the following: search-as-you-type, approximate search using multiple keywords, and recommendations and rankings based on query keywords.

Figure 5:
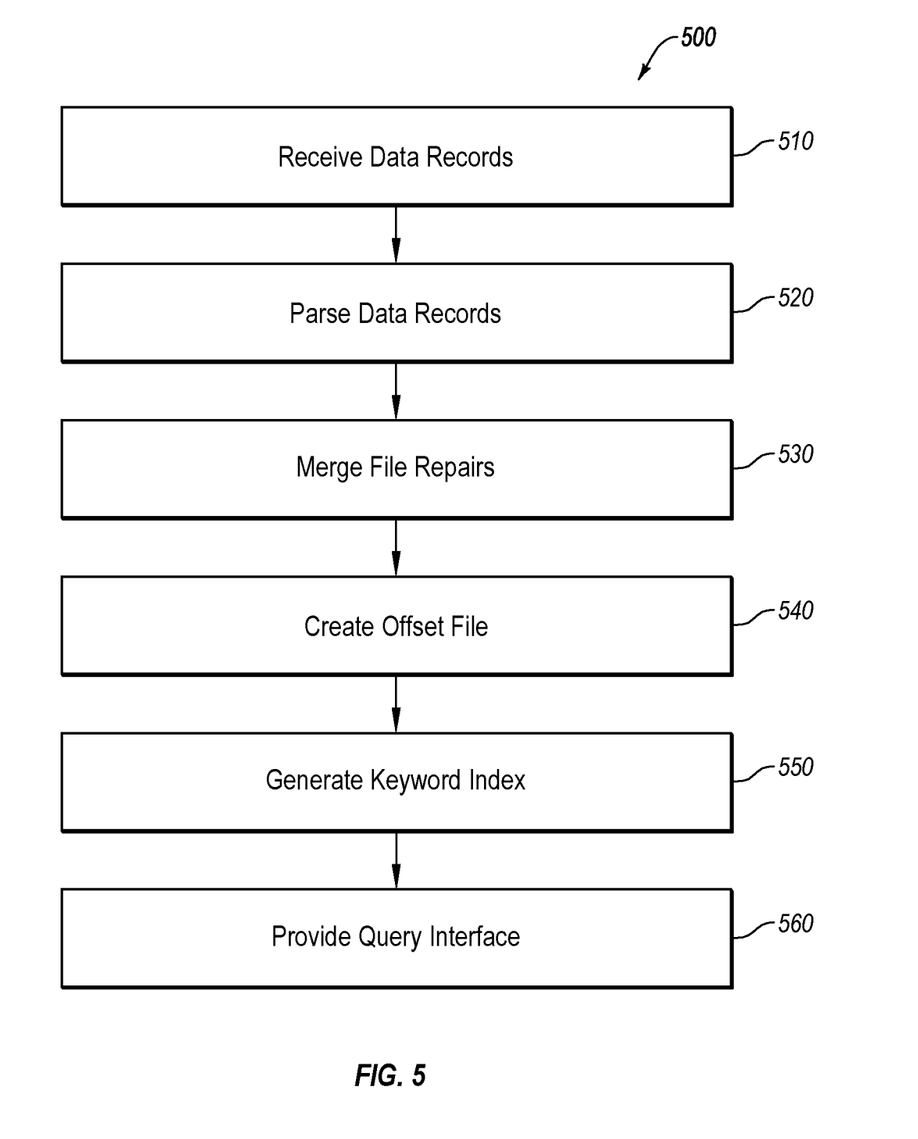
FIG. 5 illustrates a flowchart of an example method for providing local search engines over large databases.

FIG. 5 illustrates a method 500 in which a computing system performs a method for providing local search engines over large databases. In 510, the computing system receives as inputs one or more data records stored in a database. The computer system parses the data records into one or more file pairs that each include a keyword file and record ID file (520). Each file pair implicitly forms a set of inverted lists from the keywords in the keyword file to add record IDs to the record ID file. The computer system then merges a plurality of file pairs into a keyword file and a record ID file (530). The keyword file include keywords in sorted order, and the record ID file includes a list of record IDs for keywords in the keyword file. The computer system further creates an offset file which stores offset values for starting addresses of record ID lists in the record ID file (540) and generates an index of keywords by assigning unique identifiers to the keywords in the keyword file (550). The index allows searches to return those keyword IDs that correspond to keywords that are sufficiently similar to a search term. The computer system then provides a query interface that allows the database's data records to be searched using the generated index of keywords (560).

As mentioned above, the database data records may be parsed into a keyword-based inverted list per distinct keyword. When scanning through the database data records, a hashmap may be maintained. This hashmap may include entries that include a keyword and a vector of record IDs (i.e. vector 325 of FIG. 3). Each database record may be viewed as a single string, regardless of the types of the string's attributes. Accordingly, even if the database record string includes multiple different elements, it may be viewed as a single string, increasing the efficiency of searches performed over the database record. When searching, various features including search-as-you-type, approximate search using multiple keywords, and live and dynamic recommendations and rankings based on query keywords may be provided over a large database. Users may perform the searches using many different types of interfaces including web-based interfaces, desktop interfaces, mobile interfaces (optimized for mobile devices) or other types of interfaces. Accordingly, methods, systems and computer program products are provided which provide local search engine functionality over large databases.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising:
one or more processors;
a system memory storing instructions executable by the one or more processors to implement:
a parsing module that receives as inputs one or more data records stored in a database, and parses the one or more data records into one or more file pairs, wherein
each file pair includes a keyword file comprising keywords of the one or more data records, and a record ID file comprising record IDs corresponding to the keywords in the keyword file,
each file pair implicitly forms a set of inverted lists from the keywords in the keyword file to add the record IDs to the record ID file,
the parsing module maintains a hashmap while scanning through the one or more data records, the hashmap including one or more entries that include a keyword and a vector of the record IDs, and the hashmap comprises T iterations that are each created when a size of a current hashmap iteration exceeds available memory;

a merging module that
merges T file pairs into a merged keyword file and a merged record ID file, the merged keyword file including sorted keywords, the merged record ID file including a list of record IDs for the sorted keywords in the merged keyword file, and
creates an offset file which stores offset values for starting addresses of the list of record IDs in the merged record ID file;
a generating module that generates an index of the sorted keywords by assigning unique identifiers to the sorted keywords in the merged keyword file, the index allowing searches to return result keyword IDs that correspond to result keywords that are sufficiently similar to a search term; and
a searching module that provides a query interface that allows the one or more data records to be searched using the generated index.

2. The computer system of claim of claim 1, wherein the parsing module parses the one or more data records into one keyword-based inverted list per distinct keyword.

3. The computer system of claim 1, wherein the parsing module views each of the one or more data records as a single string, regardless of types of the single string's attributes.

4. The computer system of claim 1, wherein the computer system supports one or more of the following: search-as-you-type, approximate search using multiple keywords, and live and dynamic recommendations and rankings based on query keywords.

5. The computer system of claim 1, wherein the query interface comprises a web-based interface or a desktop interface.

6. The computer system of claim 1, wherein the query interface comprises a mobile interface for a mobile device.

7. A computer program product for implementing a method for providing local search engines over large databases, the computer program product comprising one or more non-transitory computer-readable storage media having stored thereon computer-executable instructions that, when executed by one or more processors of a computing system, cause the computing system to perform the method, the method comprising:
receiving as inputs one or more data records stored in a database;
parsing the one or more data records into one or more file pairs, wherein
each file pair includes a keyword file comprising keywords of the one or more data records, and a record ID file comprising record IDs corresponding to the keywords in the keyword file, and
each file pair implicitly forms a set of inverted lists from the keywords in the keyword file to add the record IDs to the record ID file;
maintaining a hashmap while scanning through the one or more data records, the hashmap including one or more entries that include a keyword and a vector of the record IDs, wherein the hashmap comprises T iterations that are each created when a size of a current hashmap iteration exceeds available memory;
merging T file pairs into a merged keyword file and a merged record ID file, the merged keyword file including sorted keywords, the merged record ID file including a list of record IDs for the sorted keywords in the merged keyword file;
creating an offset file which stores offset values for starting addresses of the list of record IDs in the merged record ID file;
generating an index of the sorted keywords by assigning unique identifiers to the sorted keywords in the merged keyword file, the index allowing searches to return result keyword IDs that correspond to result keywords that are sufficiently similar to a search term; and
providing a query interface that allows the one or more data records to be searched using the generated index.

8. The computer program product of claim of claim 7, wherein the one or more data records are parsed into one keyword-based inverted list per distinct keyword.

9. The computer program product of claim 7, wherein each of the one or more data records is viewed as a single string, regardless of types of the single string's attributes.

10. The computer program product of claim 7, wherein one or more of the following functions is provided: search-as-you-type, approximate search using multiple keywords, and live and dynamic recommendations and rankings based on query keywords.

11. The computer program product of claim 7, wherein the query interface comprises a web-based interface or a desktop interface.

12. The computer program product of claim 7, wherein the query interface comprises a mobile interface for a mobile device.

13. A computer-implemented method for providing local search engines over large databases, the method comprising:
receiving as inputs one or more data records stored in a database;
parsing the one or more data records into one or more file pairs, wherein
each file pair includes a keyword file comprising keywords of the one or more data records, and a record ID file comprising record IDs corresponding to the keywords in the keyword file, and
each file pair implicitly forms a set of inverted lists from the keywords in the keyword file to add the record IDs to the record ID file;
maintaining a hashmap while scanning through the one or more data records, the hashmap including one or more entries that include a keyword and a vector of the record IDs, wherein the hashmap comprises T iterations that are each created when a size of a current hashmap iteration exceeds available memory;
merging T file pairs into a merged keyword file and a merged record ID file, the merged keyword file including sorted keywords, the merged record ID file including a list of record IDs for the sorted keywords in the merged keyword file;
creating an offset file which stores offset values for starting addresses of the list of record IDs in the merged record ID file;
generating an index of the sorted keywords by assigning unique identifiers to the sorted keywords in the merged keyword file, the index allowing searches to return result keyword IDs that correspond to result keywords that are sufficiently similar to a search term; and
providing a query interface that allows the one or more data records to be searched using the generated index.

14. The method of claim of claim 13, wherein the one or more data records are parsed into one keyword-based inverted list per distinct keyword.

15. The method of claim 13, wherein each of the one or more data records is viewed as a single string, regardless of types of the single string's attributes.

16. The method of claim 13, wherein one or more of the following functions is provided: search-as-you-type, approximate search using multiple keywords, and live and dynamic recommendations and rankings based on query keywords.

17. The method of claim 13, wherein the query interface comprises a web-based interface, a desktop interface, or a mobile interface for a mobile device.

* * * * *